METHOD FOR REACTIVE SPUTTER DEPOSITION OF PHOSPHOSILICATE GLASS

Filed March 1, 1972

United States Patent Office 3,743,587

Patented July 3, 1973

3,743,587

METHOD FOR REACTIVE SPUTTER DEPOSITION OF PHOSPHOSILICATE GLASS

Thomas Nolan Kennedy, San Jose, Calif., assignor to International Business Machines Corporation, Armonk, N.Y.

Filed Mar. 1, 1972, Ser. No. 230,869

Int. Cl. C23c *15/00*

U.S. Cl. 204—192 5 Claims

ABSTRACT OF THE DISCLOSURE

A method for reactive sputter depositing phosphosilicate glass on a substrate utilizing a sputtering chamber having a fused quartz target disposed on a target electrode, and a substrate holder spaced from the target holder electrode. Substrates to be covered are introduced into the sputtering chamber and located on the substrate holder electrode, a R.F. potential is applied across the target electrode and the substrate holder electrode to establish a glow discharge in the region between the electrodes, and vaporized $P_2O_5$ is introduced into the region of the glow discharge. The vaporized $P_2O_5$ and target material result in the deposition of a phosphosilicate glass layer.

BACKGROUND OF THE INVENTION

Field of the invention

This invention relates to deposition of dielectric coating on substrates, more specifically to a method of reacfive sputtering phosphosilicate glass on semiconductor substrates.

Description of the prior art

The $Na^+$ gettering effect of phosphosilicate glass coatings on semiconductor devices is well known in the art. Such layers are particularly useful in FET devices to control mobile charges in the capacitive component of the device and the overlying passivating layer, which charges when not controlled, cause threshold voltage drift under voltage stress. These mobile charges are typically positively charged ions that find their way into the film and substrate as contaminants. Phosphosilicate glass is an effective barrier against positive ion migration, primarily $Na^+$ ions, since it electrostatically binds the positive ions in the phosphosilicon oxygen lattice.

A number of methods are known for depositing phosphosilicate glass. However, each of the known methods have inherent limitations which either limit the nature of the application, or satisfactory control of the resultant composition is difficult or impossible.

One technique for producing a phosphosilicate glass involves passing a $P_2O_5$ vapor over a previously deposited $SiO_2$ layer at relatively high temperatures on the order of 800° C. The $P_2O_5$ vapor is obtained by the reaction of $POCl_3$ and $O_2$. This technique is described in IBM TDB vol. 12, No. 12, May 1970, page 2086. While the technique is dependable and controllable, it necessitates exposing the semiconductor substrate to relatively high temperatures. In many instances, as when the layer must be deposited over a metallurgy or where diffused regions exist in the semiconductor body, exposure to such temperatures is not practical.

Evaporation techniques can be used as an alternate method for supplying $P_2O_5$ to a heated $SiO_2$ surface for a reaction which results in phosphosilicate glass. While $P_2O_5$ can be vaporized at moderate temperatures it is highly deliquesient. Any moisture in the atmosphere is immediately absorbed by the $P_2O_5$. This presents very serious problems during deposition since any moisture in the chamber is immediately absorbed by the $P_2O_5$. In order to promote the reaction between the $P_2O_5$ combined with water and $SiO_2$, the wafer must be heated to temperatures on the order of 1200° C. This high temperature could seriously disrupt existing diffused regions, metallurgies, etc. on the wafer. Further, the combination of $P_2O_5$ and water produces phosphoric acid which is very corrosive.

Another technique for depositing phosphosilicate glass is R.F. sputtering using a target of phosphosilicate glass. However, experimentation has indicated that it is difficult to obtain the requisite $P_2O_5$ content in the deposited film. The deposited film does not have the same composition as the target. Experimental efforts involving R.F. sputtering of the 5% $P_2O_5$, 95% $SiO_2$ target resulted in films with little or no $P_2O_5$. Apparently this is the result of a high vapor pressure of $P_2O_5$ at the sputter conditions. The $SiO_2$ component of the PSG target finds its way to the substrates, however, the $P_2O_5$ vaporizes and is apparently lost in the chamber and inert gas stream.

In general, known techniques for depositing phosphosilicate glass are not completely satisfactory for meeting many semiconductor device fabrication applications. The known techniques may require heating the device to high temperatures which may destroy or impair structure on the device, or control of the $P_2O_5$ content is unsatisfactory.

SUMMARY OF THE INVENTION

It is an object of the invention to provide a new and improved technique for depositing phosphosilicate glass layers.

Another object of this invention is to provide a new and improved method of reactively R.F. sputter depositing phosphosilicate glass layers.

Other objects will be apparent from the ensuing description of the invention.

In accordance with the aforementioned objects the present invention is a method of reactively sputtering phosphosilicate glass on a substrate wherein there is provided a sputtering chamber having a fused quartz target disposed on a target electrode and a substrate holder electrode in spaced relation to the target electrode. Substrates to be covered with the phosphosilicate glass film are located on the substrate holder, and an inert gas, for example, argon introduced into the chamber, an R.F. potential applied across the target electrode and the substrate holder electrode to establish a glow discharge in the region between the electrodes and vaporized $P_2O_5$ introduced into the region of the glow discharge. During the resultant process the fused quartz particles bombarded from the target pass through the $P_2O_5$ vapor and a reaction takes place either in the atmosphere or at the wafer surface or possibly both in which there is formed a phosphosilicate glass film. The $P_2O_5$ vapor is preferably generated by providing a plurality of tantalum boats filled with $P_2O_5$ which is heated and vaporized in the boat by the heat generated during the sputtering reaction.

DESCRIPTION OF THE DRAWINGS

The foregoing and other objects, features and advantages of the invention will be apparent from the following more particular description of preferred embodiments of the process of the invention as illustrated in the accompanying drawings.

DESCRIPTION OF PREFERRED EMBODIMENTS

The phenomenon of surface inversion in semiconductors is well known. It is basically the formation of a negatively charged layer adjacent to the semiconductor-insulator layer interface. It is caused by migration under electrical stress of positively charged ions in the insulating layer to a position adjacent the semiconductor surface. These positively charged ions, principally sodium ions, attract electrons from the semiconductor body to the surface regions. This condition is particularly troublesome in N type semiconductors because the materials become more conductive. In field effect transistors it significantly effects the threshhold voltage. The gettering effect of phosphosilicate glass has also been recognized as evidenced by U.S. Pat. 3,343,049 which suggests utilizing a $P_2O_5$ layer in combination with an $SiO_2$ layer to prevent or minimize inversion.

Figure 1:
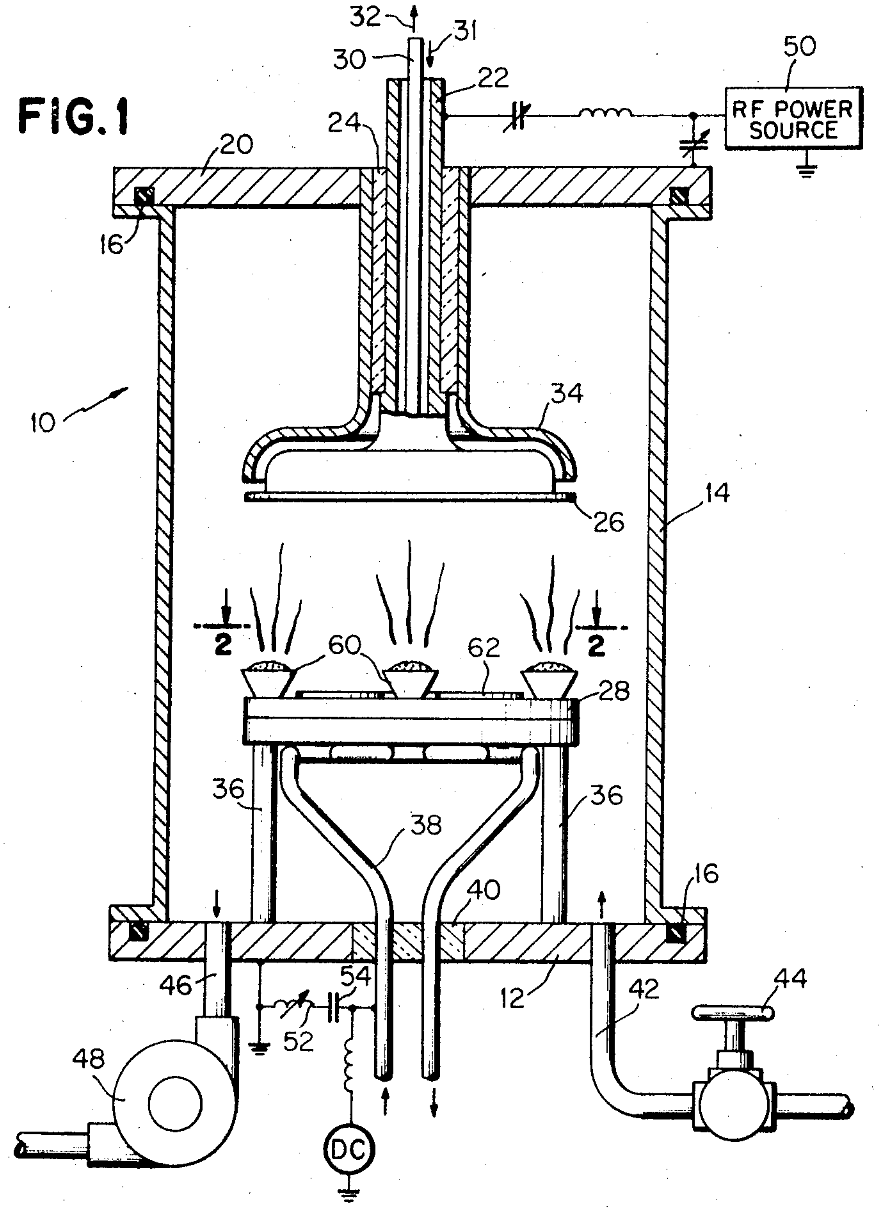
FIG. 1 is a front elevational view of a sputtering apparatus capable of carrying out the process of the invention.

An R.F. sputtering apparatus 10 suitable for use in the practice in the method of the invention is depicted in FIG. 1. Apparatus 10 has a chamber consisting of a base plate 12, a cylindrical wall 14 supported on plate 12 with the joint sealed with a seal 16, and a top plate 20 resting on the top flange of cylinder wall 14 with the joint sealed with a second seal 16. A target electrode 22 is supported on plate 20 and insulated therefrom with a dielectric member 24. Target 26 is supported on the bottom surface of target electrode 22 in opposed relation to substrate holder electrode 28. Target electrode 22 is preferably cooled by providing a concentrically disposed tube 30 within the hollow stem portion of electrode 22, and water as an other cooling liquid circulated as indicated by arrows 31 and 32. A shield 34 surrounds the target electrode 22 and is spaced therefrom to prevent sputtering of the back side of electrode. Substrate holder electrode 28 is supported on legs 36 of dielectric material which engage base plate 12. Cooling tube 38 engages the bottom side of electrode 28 and serve both as a means for cooling an electrode and providing electrical contact thereto. Tube 38 extends through base plate 12 through a dielectric plug 40. An inlet 42 provided with a suitable valve means 44 is adapted to introduce gas into the chamber. Outlet 46 connected to a vacuum pump 48 is used to exhaust the inside of the chamber. An R.F. power source 50 is arranged to apply an R.F. potential across base plate 12 and target electrode 22. A variable impedence 52 and capacitor 54 are connected in series across the base plate 12 and substrate holder electrode 28 in order to place a bias on the electrode 28. The structure of the sputtering apparatus and the arrangement of the power source is disclosed and claimed in U.S. Pat. 3,617,459. When the R.F. power source is activated a visible glow discharge is formed between the target holder electrode 22 and substrate holder electrode 28 which has the effect of bombarding particles from the target 26 which are subsequently deposited on elements supported on substrate holder 28.

Figure 2:
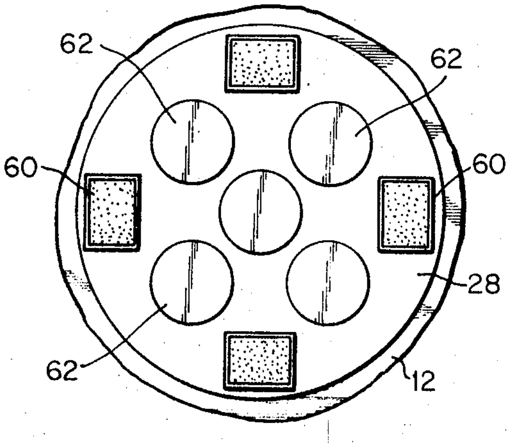
FIG. 2 is a top plan view of the substrate holder electrode illustrating a preferred specific embodiment of an arrangement of wafers and $P_2O_5$ containing boats.

In the practice of the method of this invention one or more boats 60, preferably made of Ta, are supported on substrate holder 28 as indicated in both FIGS. 1 and 2. Each boat 60 contains a quantity of finely divided $P_2O_5$ which when heated will vaporize permeate the region of the visible glow discharge between the electrodes. In operation the $P_2O_5$ introduced into the region of the glow discharges finds its way back to the wafers 62 supported on substrate holder 28 and is deposited along with the glass material, typically quartz, from target 26 to form a phosphosilicate glass layer. In operation the temperature of substrate holder electrode 28 is increased by the R.F. power source to a temperature sufficiently high to vaporize the $P_2O_5$ in boats 60. A power density in the range of 10 to 20 watts/sq. inch has been found to be sufficient to raise the temperature of the substrate holder electrode from 300 to 450° C. The temperature of the substrate holder 28 can be controlled by circulating cooling fluid through conduit 38 as indicated by the arrows. However, if necessary or desirable the boats can be heated separately by other suitable heating means. The number of boats 60 provided is determined by the desired content of the $P_2O_5$ in the resultant phosphosilicate glass film, the temperature of the substrate holder 28 during operation, and the area of the substrate holder. The pressure of the $P_2O_5$ in the visible glow discharge region is preferably in the range of $2\times10^{-3}$ to $5\times10^{-3}$ torr. Target 26 can be of any suitable glass combination which combined with $P_2O_5$ produces a phosphosilicate glass, preferably target 26 is fused quartz. The resultant phosphosilicate glass film deposited on wafer 62 is preferably in the range of 3 to 5% which is sufficient to achieve the objectives of most gettering applications.

The following examples are made of record to more clearly illustrate the practice of the method of the invention and are not intended to unduly limit same.

EXAMPLE I

Five sputter deposition runs were made on five separate wafers utilizing a sputtering apparatus similar to that depicted in FIG. 1. In all of the runs a fused quartz target was utilized which was spaced from the substrate holder electrode by 1½ inches. A single wafer was placed centrally on the substrate holder with 4 Ta boats filled with $P_2O_5$ resting on the electrode. 500 watts of power representing a power density of 14 watts per/sq. inch was applied across the target electrode and the substrate holder electrode. A bias voltage of −100 volts was maintained between the base plate and the substrate holder electrode by manipulating the variable inductance. A pressure of 20 microns of argon was maintained during the sputtering operation within the chamber. In the first run there was no $P_2O_5$ in the Ta boats. In the second run $P_2O_5$ was placed in the boats and the distance from the wafer to the boats was maintained at 4 inches. In the 4th and 5th runs the distance from the boats to the wafer was decreased to 3 inches. The results of the five runs are depicted in the following table:

| Sample | Power (watts) | Bias (volts) | Pressure (microns Ar) | Reactive species | Distance from boat to wafer, inches | Percent $P_2O_5$ | Sat. coulomb | N charge cm.² | E* (ev.) |
|---|---|---|---|---|---|---|---|---|---|
| 1 | 500 | −100 | 20 | None |  | 0 | $1.2\times10^{-8}$ | $3.8\times10^{13}$ | 0.93 |
| 2 | 500 | −100 | 20 | $P_2O_5$ | 3 | 5 | $0.45\times10^{-10}$ | $1.4\times10^{11}$ | 1.18 |
| 3 | 500 | −100 | 20 | $P_2O_5$ | 3 | 5 | $0.5\times10^{-10}$ | $1.6\times10^{11}$ | 1.16 |
| 4 | 500 | −100 | 20 | $P_2O_5$ | 4 | 4 | $3.1\times10^{-10}$ | $3.1\times10^{11}$ | 1.05 |
| 5 | 500 | −100 | 20 | $P_2O_5$ | 4 | 4 | $3.8\times10^{-10}$ | $3.8\times10^{11}$ | 1.11 |

The mole percent of $P_2O_5$ in the resultant films on the semiconductor wafers was measured by exposing the film to X-ray radiation from a chromium target X-ray tube and the radiation characteristics of phosphorus detected using a flow proportional counter and a graphite analyzing crystal. The samples were then compared to samples of PSG films and corrected on the basis of thickness. In the above table in column N indicating charges per cm. sq. the variation indicates the effectiveness of the gettering. The values for respective sputter films are proportional to the amount of $P_2O_5$ in the films. As evidenced in the table, run #1 containing no $P_2O_5$ has charges numbering twice the magnitude of the films which embody $P_2O_5$. The term E* in the last column is an indication of activation energy which is the measure of the energy in the electron volts necessary for inducing motion of the sodium ion from one site to another through the film. It comes from the equation:

$$Q=Q_0\ EXP\ [E^*/RT]$$

where Q is equal to the charge in

Coulombs $Q_0$=charge at 0° K.
$k$=Boltzmann's constant
T=is the absolute temperature The five runs indicate that vaporizing $P_2O_5$ in a sputtering chamber in the region of the glow discharge adds $P_2O_5$ to the deposition film. It also clearly indicates the effectiveness of films as getting films when produced by the method of the invention. It also provides an indication of the effect produced by positioning the Ta boats at varying distances from the substrates.

EXAMPLE II

Two runs were made with two different targets having different $P_2O_5$ content. No $P_2O_5$ vapor source was utilized. In the first run a 2 mole percent $P_2O_5$ 98 mole percent $SiO_2$ target having a diameter of 4 inches was supported on the target electrode. The second run utilized a 4 inch target having 8 mole percent $P_2O_5$ and 92 mole percent $SiO_2$. The following table depicts the conditions and results of the two runs:

| Sample | Power | Bias volts | Pressure | Mole percent P | N | E* |
|---|---|---|---|---|---|---|
| 1 | 1,000 | −100 | 10 | .41 | $1.25\times10^{14}$ | 2.0 |
| 2 | 280 | −100 | 10 | 0.896 | $2.9\times10^{14}$ | .9 |

As the above data indicates the $P_2O_5$ contents of the sputtered films were significantly less than the targets used in the runs. Further the gettering effectiveness of the resultant deposited film compared quite unfavorably with the film deposited utilizing a $P_2O_5$ vaporization source described in Example I.

While the invention has been particularly shown and described with reference to preferred embodiments thereof, it will be understood by those skilled in the art that the foregoing and other changes in form and details may be made therein without departing from the spirit and scope of the invention.

I claim:

1. A method of sputter depositing phosphosilicate glass on a substrate comprising,
   providing a sputtering chamber having a glass target disposed on a target electrode,
   introducing into the sputtering chamber substrates to be covered with phosphosilicate glass and locating said substrates on a substrate holder electrode spaced from said target electrode,
   providing a means to supply vaporized $P_2O_5$ to the region between said target and said substrate holder electrode,
   establishing and maintaining an atmosphere of an inert gas,
   applying an R.F. potential across said target electrode and said substrate holder electrode to establish a glow discharge in the region between said electrodes, and
   actuating said means to supply vaporized $P_2O_5$ to establish and maintain a $P_2O_5$ vapor pressure in at least the immediate region of the glow discharge.

2. The method of claim 1 wherein vaporized $P_2O_5$ is supplied by at least one boat containing solid $P_2O_5$ positioned on the substrate holder electrode.

3. The method of claim 2 wherein said, at least one, boat is heated by conduction from said substrate holder electrode.

4. The method of claim 2 wherein said boat is heated to a temperature in the range of 300 to 450° C.

5. The method of claim 1 wherein the vapor pressure of the $P_2O_5$ in the region between the electrodes is in the range of $2\times10^{-3}$ to $5\times10^{-3}$ torr.

References Cited

UNITED STATES PATENTS

| | | | |
|---|---|---|---|
| 3,492,215 | 1/1970 | Conant | 204—192 |
| 3,673,006 | 6/1972 | Plumat et al. | 204—192 |

JOHN H. MACK, Primary Examiner

S. S. KANTER, Assistant Examiner